(12) United States Patent
Jang et al.

(10) Patent No.: US 9,403,530 B2
(45) Date of Patent: Aug. 2, 2016

(54) AIR FLOW SENSOR CHIP-HEATING CONTROL DEVICE AND METHOD OF DIESEL HYBRID ELECTRIC VEHICLE

(71) Applicant: Hyundai Motor Company, Seoul (KR)

(72) Inventors: Hwa Yong Jang, Gyeonggi-do (KR); Ho Kyun Chun, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/564,538

(22) Filed: Dec. 9, 2014

(65) Prior Publication Data
US 2016/0068154 A1    Mar. 10, 2016

(30) Foreign Application Priority Data
Sep. 5, 2014    (KR) .......................... 10-2014-0118333

(51) Int. Cl.
*G06F 7/00* (2006.01)
*B60W 20/00* (2016.01)
*F02B 29/04* (2006.01)
(Continued)

(52) U.S. Cl.
CPC .............. *B60W 20/40* (2013.01); *B60W 10/06* (2013.01); *B60W 10/30* (2013.01); *B60W 20/00* (2013.01); *F02B 29/0493* (2013.01); *F02D 41/18* (2013.01); *G01F 1/699* (2013.01); *G01F 1/6983* (2013.01); *F02D 41/1494* (2013.01); *F02D 2200/021* (2013.01); *F02D 2200/101* (2013.01); *F02D 2200/501* (2013.01); *Y10S 903/902* (2013.01)

(58) Field of Classification Search
USPC ................. 701/22, 36; 180/65.21, 339, 65.22; 60/277; 903/902; 237/12.3 R, 12.3 A, 237/12.3 B, 12.3 C; 165/42
See application file for complete search history.

(56) References Cited

U.S. PATENT DOCUMENTS 4,846,133 A    7/1989    Shiraishi et al.
6,021,957 A *  2/2000    Takechi ............. B60H 1/00842
                                                    165/42
(Continued)

FOREIGN PATENT DOCUMENTS

EP    0242822 A2    10/1987
FR    2988136 B1 *  11/2014    .......... F02B 29/0493
(Continued)

OTHER PUBLICATIONS

Experimental investigation of a single cylinder diesel engine as a hybrid power unit for a series hybrid electric vehicle; M. T. Al-Atabi; T. F. Yusaf; Research and Development, 2002. SCOReD 2002. Student Conference on; Year: 2002; pp. 261-264, DOI: 10.1109/SCORED.2002.1033107.*

(Continued)

*Primary Examiner* — Cuong H Nguyen
(74) *Attorney, Agent, or Firm* — Mintz Levin Cohn Ferris Glovsky and Popeo, P.C.; Peter F. Corless

(57) ABSTRACT

An air flow sensor chip-heating control device and method of a diesel hybrid electric vehicle controls whether an air flow sensor installed in an engine intake system of the diesel hybrid electric vehicle performs a chip-heating operation. Particularly, the air flow sensor chip-heating control device performs a chip heating operation of the air flow sensor based on a result obtained by deciding a driving history of an engine when the vehicle enters into a hybrid mode during driving of the engine.

8 Claims, 2 Drawing Sheets

(51) Int. Cl.
*F02D 41/18* (2006.01)
*G01F 1/698* (2006.01)
*G01F 1/699* (2006.01)
*B60W 10/06* (2006.01)
*B60W 10/30* (2006.01)
*F02D 41/14* (2006.01)

(56) References Cited

U.S. PATENT DOCUMENTS

| | | | | |
|---|---|---|---|---|
| 7,654,077 | B2 * | 2/2010 | Zillmer | B60K 6/48 123/688 |
| 8,489,267 | B1 * | 7/2013 | Lombardo | B60H 1/00385 123/299 |
| 9,045,028 | B2 * | 6/2015 | Ichikawa | B60H 1/00207 |
| 2003/0154807 | A1 | 8/2003 | Hecht et al. | |
| 2008/0209886 | A1 * | 9/2008 | Zillmer | B60K 6/48 60/277 |
| 2011/0218698 | A1 * | 9/2011 | Bissontz | B60L 11/00 701/22 |
| 2012/0247846 | A1 * | 10/2012 | Ichikawa | B60H 1/00207 180/65.21 |
| 2015/0158367 | A1 * | 6/2015 | Jeong | B60H 1/00878 701/36 |

FOREIGN PATENT DOCUMENTS

| | | |
|---|---|---|
| JP | 3464221 B2 | 11/2003 |
| JP | 2009-257147 A | 11/2009 |
| JP | 2011-001822 | 1/2011 |
| JP | 2012-168005 | 9/2012 |
| JP | 2012-218522 | 11/2012 |
| JP | 2013-002386 | 1/2013 |
| JP | 2013142300 A * | 7/2013 ............ B60H 1/32 |
| JP | 2013-234574 A | 11/2013 |
| KR | 10-2013-0138334 A | 12/2013 |
| WO | WO2009146126 A1 * | 12/2009 ............ F10K 13/00 |
| WO | 2013/108813 A1 | 7/2013 |

OTHER PUBLICATIONS

Development of a Thermal Management System for Energy Sources of an Electric Vehicle; Y. H. Hung; Y. F. Lue; H. J. Gu IEEE/ASME Transactions on Mechatronics; Year: 2016, vol. 21, Issue: 1; pp. 402-411, DOI: 10.1109/TMECH.2015.2454851.*

Fuel consumption effects of a diesel hybrid electric vehicle across a range of driving styles and ambient conditions; F. Jehlik; E. Rask; S. Magand; E. Condemine; Transportation Electrification Conference and Expo (ITEC), 2015 IEEE; Year: 2015 pp. 1-6, DOI: 10.1109/ITEC.2015.7165781.*

Numerical and experimental investigation of heat transfer phenomena over an electronic module; D. Agonafer; S. Furkay Semiconductor Thermal and Temperature Measurement Symposium, 1990. SEMI-THERM VI, Proceedings., Sixth Annual IEEE Year: 1990; p. 103, DOI: 10.1109/STHERM.1990.68498.*

* cited by examiner

AIR FLOW SENSOR CHIP-HEATING CONTROL DEVICE AND METHOD OF DIESEL HYBRID ELECTRIC VEHICLE

CROSS-REFERENCE TO RELATED APPLICATION

This application claims under 35 U.S.C. §119(a) the benefit of Korean Patent Application No. 10-2014-0118333 filed on Sep. 5, 2014, the entire contents of which are incorporated herein by reference.

BACKGROUND (a) Technical Field

The present invention relates to an air flow sensor chip-heating control device and method of a diesel hybrid electric vehicle, more particularly, to an air flow sensor chip-heating control device, which controls whether an air flow sensor installed in an engine intake system of the diesel hybrid electric vehicle performs a chip-heating operation.

(b) Description of the Related Art

In general, an engine of a car generates power by means of explosive power generated when a mixture gas obtained by mixing fuel and air in the atmosphere at an appropriate ratio is ignited in a combustion chamber.

In particular, fuel passing through a fuel supply device stored in a fuel tank of the car is mixed with air flowed in the engine from the exterior, and the engine repeats intake, compression, explosion and exhaust cycles as the mixture gas produced as described above is injected into cylinders of the engine. Thus, the car receives power provided through such a process.

The engine of the car can be categorized as a gasoline engine, a diesel engine, a gas engine and the like according to fuel used therein. However, air and fuel that flow in the engine through an intake system should be mixed with an appropriate air-fuel ratio in order to generate power using combustion explosive power of the engine regardless of the type of engine.

First, the amount of air that flows in the engine through the intake system should be sensed in order to set the mixture ratio of air and fuel. Thus, an air flow sensor for measuring an amount of air that flows in the engine is used in the intake system of the car.

The air flow sensor installed in the intake system of the car senses an amount of air that flows in the engine through the intake system, and enables the amount of fuel for driving the engine of the car to be determined through the sensed amount of the air.

However, an oil component is adhered to a chip built in the air flow sensor due to the countercurrent of oil vapor when the engine is stopped during driving of the car.

In order to prevent such an adhesion phenomenon, conventionally, the chip of the air flow sensor was forcibly heated every time until a main relay for transmitting electrical energy to a vehicle electric load (electrical and electronic device) is off after key-off, thereby burning and removing pollutants (oil components, dust and the like) adhered to the chip.

Specifically, if the revolutions per minute (rpm) of the engine increases to a certain value or more during driving of the engine, and the voltage of a battery is a reference value or more, the chip of the air flow sensor is heated for a certain period of time until before the main relay is off after the ignition of the engine is off in the key-off.

Meanwhile, referring to FIG. 2, in the case of a diesel hybrid electric vehicle, the vehicle enters into a hybrid operation mode several times within a one driving cycle, and the operation (driving) of the engine is stopped when the vehicle enters into the hybrid operation mode during driving of the engine. In this state, an ignition-on state is maintained for the purpose of the next engine operation, and therefore, the chip-heating function of the air flow sensor is not performed.

Accordingly, there occurs a phenomenon in which an oil component is adhered to the chip of the air flow sensor due to the countercurrent of oil vapor when the engine is stopped during driving of the vehicle, thereby resulting in the occurrence of a trouble.

SUMMARY

The present invention provides an air flow sensor chip-heating control device of a diesel hybrid electric vehicle, which performs a chip heating operation of an air flow sensor based on a result obtained by a decision made based on a driving history of an engine when the vehicle enters into a hybrid mode during driving of the engine.

In one aspect, the present invention provides an air flow sensor chip-heating control device of a diesel hybrid electric vehicle, the device including: a hybrid control unit (HCU) configured to request an engine control unit (ECU) to stop operation of an engine when the diesel hybrid electric vehicle enters into a hybrid operation mode during operation of the engine, and transmit, to the ECU, vehicle status information when the diesel hybrid electric vehicle enters into the hybrid operation mode; and the ECU configured to decide an operation history of the engine based on the vehicle status information when the diesel hybrid electric vehicle enters into the hybrid operation mode, which is transmitted from the HCU, and determine whether the chip-heating operation of an air flow sensor is performed based on the decision result.

In an exemplary embodiment, the vehicle status information when the diesel hybrid electric vehicle enters into the hybrid operation mode may include information on an engine coolant temperature, information on a vehicle speed, information on an accumulation time when the vehicle speed is not less than a first reference value, information on a revolutions per minute (RPM) of the engine, and information on an accumulation time when the RPM of the engine is not less than a second reference value.

As used herein, a "first" reference value corresponds to the vehicle speed, a "second" reference value corresponds to the RPM of the engine, a "third" reference value corresponds to the accumulation time, and a "fourth" reference value corresponds to the engine coolant temperature.

In another exemplary embodiment, in order to decide the operation history of the engine when the diesel hybrid electric vehicle enters into the hybrid operation mode, the ECU may decide whether the engine is warmed up, whether the diesel hybrid electric vehicle is driven at high speed, and whether the engine is operated at high speed.

In still another exemplary embodiment, in order to decide whether the engine is warmed up when the diesel hybrid electric vehicle enters into the hybrid operation mode, the ECU may decide whether the engine coolant temperature is not less than a fourth reference value, based on the vehicle status information transmitted from the HCU.

In yet another exemplary embodiment, in order to decide whether the diesel hybrid electric vehicle is driven at high speed when the diesel hybrid electric vehicle enters into the hybrid operation mode, the ECU may decide whether the vehicle speed is not less than a first reference value and whether the accumulation time when the vehicle speed is not less than the first reference value is not less than a third reference value, based on the vehicle status information transmitted from the HCU.

In still yet another exemplary embodiment, in order to decide whether the engine is operated at high speed when the diesel hybrid electric vehicle enters into the hybrid operation mode, the ECU may decide whether the RPM of the engine is not less than a second reference value and whether the accumulation time when the RPM of the engine is not less than the second reference value is not less than a third reference value, based on the vehicle status information transmitted from the HCU.

In a further exemplary embodiment, if the engine coolant temperature is not less than a fourth reference value, the vehicle speed is not less than the first reference value, the accumulation time when the vehicle speed is not less than the first reference value is not less than the third reference value, the RPM of the engine is not less than the second reference value, and the accumulation time when the RPM of the engine is not less than the second reference value is not less than the third reference value, as the result obtained by deciding the operation history of the engine based on the vehicle status information when the diesel hybrid electric vehicle enters into the hybrid operation mode, the ECU may stop the operation of the engine and perform the chip-heating operation of the air flow sensor in the diesel hybrid electric vehicle.

A method of operating an air flow sensor chip-heating control device of a diesel hybrid electric vehicle can include the steps of: requesting, by a hybrid control unit (HCU), an engine control unit (ECU) to stop operation of an engine when the diesel hybrid electric vehicle enters into a hybrid operation mode during operation of the engine; transmitting, to the ECU, vehicle status information when the diesel hybrid electric vehicle enters into the hybrid operation mode; deciding an operation history of the engine, which is performed by the ECU based on the vehicle status information when the diesel hybrid electric vehicle enters into the hybrid operation mode, which is transmitted from the HCU; and determining whether a chip-heating operation of an air flow sensor is performed based on the step of deciding the operation history of the engine.

Other aspects and exemplary embodiments of the invention are discussed infra.

In the air flow sensor chip-heating control device and method of the diesel hybrid electric vehicle according to the present invention, it is decided whether the condition for performing the chip-heating function of the air flow sensor is satisfied by detecting the operation history of the engine when the diesel hybrid electric vehicle enters into the hybrid operation mode, and the chip heating function of the air flow sensor is performed based on the decision result, so that it is possible to prevent deterioration of the quality of the air flow sensor due to the countercurrent of oil vapor generated when the operation of the engine is stopped in the diesel hybrid electric vehicle in which the driving of the engine is frequently stopped (e.g., the hybrid operation mode) as compared with a general diesel vehicle. The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
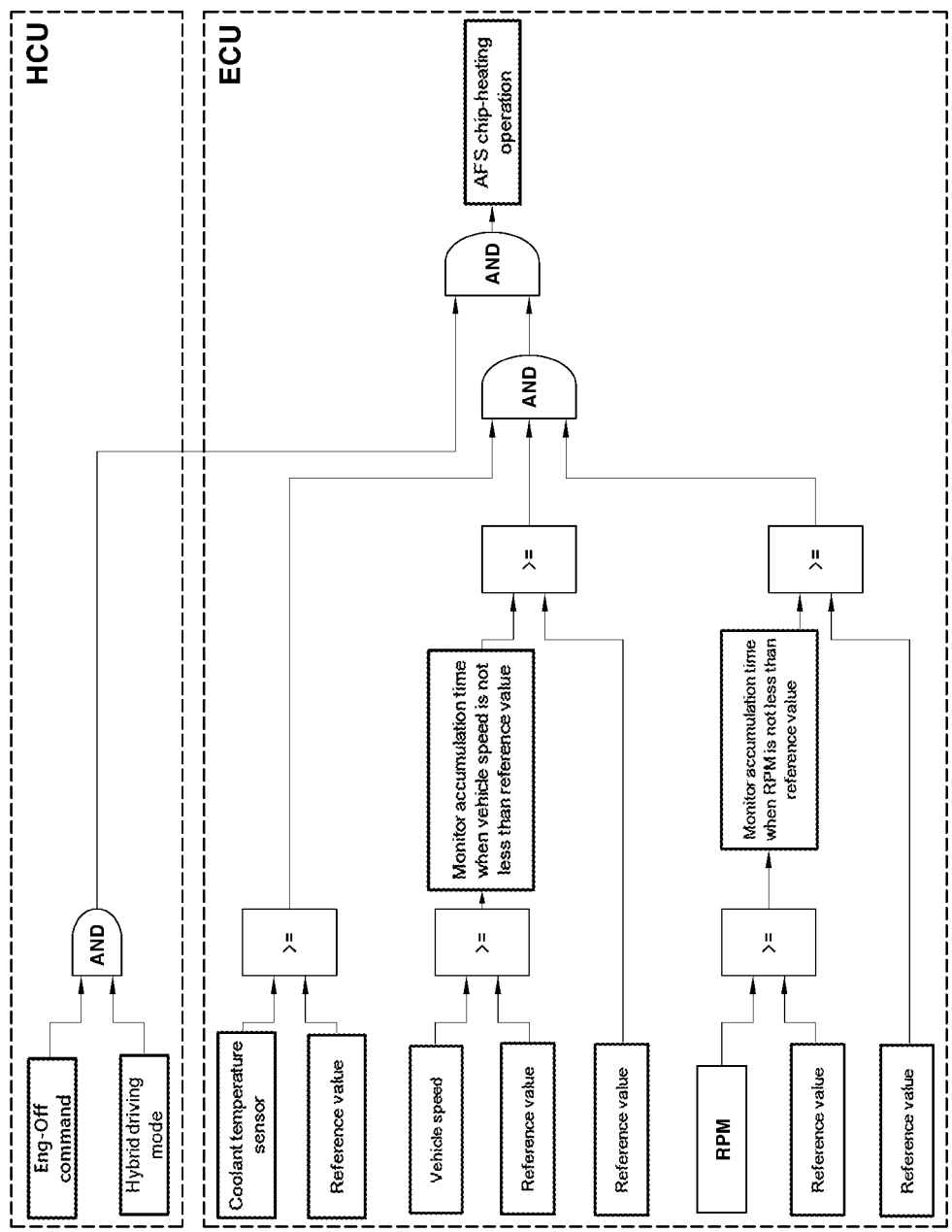
FIG. 1 is a view illustrating conditions for performing a chip heating operation of an air flow sensor in a diesel hybrid electric vehicle according to an embodiment of the present invention.
Figure 2:
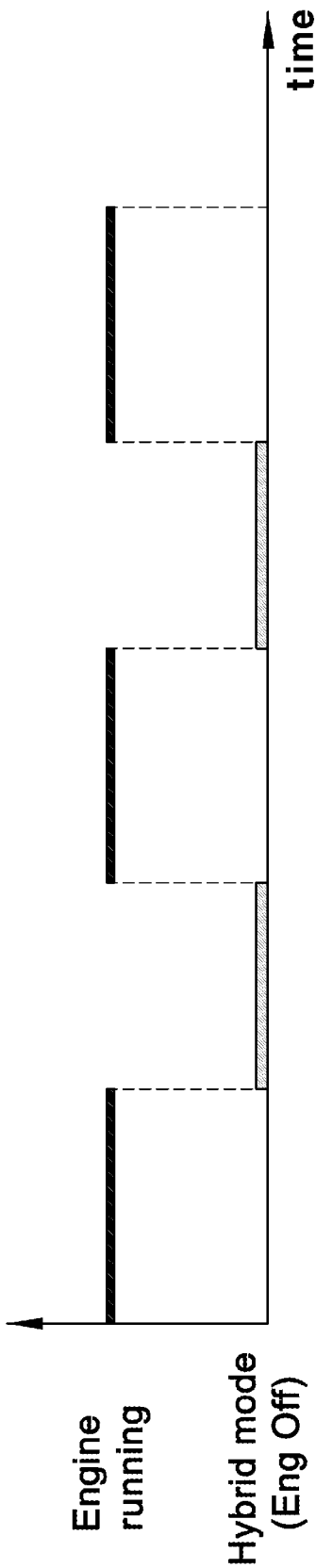
FIG. 2 is an exemplary view illustrating a driving mode of the diesel hybrid electric vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Referring to FIG. 1, a hybrid control unit (HCU) requests an engine control unit (ECU) to stop the operation (driving) of an engine when a diesel hybrid electric vehicle enters into a hybrid operation mode during driving of the engine, and transmits, to the ECU, vehicle status information when the diesel hybrid electric vehicle enters into the hybrid operation mode.

In this state, the HCU transmits, to the ECU, information on an engine coolant temperature, information on a vehicle speed, information obtained by monitoring an accumulation time when the vehicle speed is not less than a first reference value, information on a revolutions per minute (RPM) of the engine, information obtained by monitoring an accumulation time when the RPM of the engine is not less than a second reference value, and the like as the vehicle status information when the diesel hybrid electric vehicle enters into the hybrid operation mode. The ECU determines whether an air flow sensor performs a chip-heating operation, using the vehicle status information transmitted from the HCU.

As used herein, a "first" reference value corresponds to the vehicle speed, a "second" reference value corresponds to the RPM of the engine, a "third" reference value corresponds to the accumulation time, and a "fourth" reference value corresponds to the engine coolant temperature.

In order to detect and decide an operation history with respect to how long the engine is driven, the ECU receiving the request to stop the operation of the engine from the HCU use the vehicle status information when the diesel hybrid electric vehicle enters into the hybrid operation mode, which is transmitted from the HCU. The ECU decides whether the engine is driven to an extent where the chip-heating function of the air flow sensor is required, using the vehicle status information, and operates a chip-heating function of the air flow sensor based on the decision result.

In particular, the ECU decides whether a condition for performing the chip-heating function of the air flow sensor is satisfied based on the engine operation history when the diesel hybrid electric vehicle enters into the hybrid operation mode. If the condition is satisfied, the ECU stops the operation of the engine and performs the chip-heating function of the air flow sensor. If the condition is not satisfied, the ECU stops the operation of the engine and does not perform the chip-heating function of the air flow sensor.

In order to determine whether the chip-heating function of the air flow sensor is performed, the ECU decides whether the engine is warmed up, using the vehicle status information when the diesel hybrid electric vehicle enters into the hybrid operation mode, which is transmitted from the HCU. In addition, the ECU decides whether the diesel hybrid electric vehicle is driving at high speed, and decides whether the engine is operated (rotated) at high speed.

In order to decide whether the engine is warmed up when the diesel hybrid electric vehicle enters into the hybrid operation mode, the ECU decides whether the engine coolant temperature is not less than a fourth reference value, using the information on the engine coolant temperature, transmitted from the HCU.

In order to decide whether the diesel hybrid electric vehicle is driven at high speed when the diesel hybrid electric vehicle enters into the hybrid operation mode, the ECU decides whether the vehicle speed is not less than a first reference value, using the information on the vehicle speed and the information obtained by monitoring the accumulation time, which are transmitted from the HCU, and decides whether the accumulation time when the vehicle sped is not less than the first reference value is not less than a third reference value.

In order to decide whether the engine is operated at high speed when the diesel hybrid electric vehicle enters into the hybrid operation mode, the ECU decides whether the RPM of the engine is not less than a second reference value, using the information on the RPM of the engine and the information obtained by monitoring the accumulation time, which are transmitted from the HCU, and decides whether the accumulation time when the RPM of the engine is not less than the second reference value is not less than a third reference value.

If the conditions are all satisfied, i.e., if the engine coolant temperature is not less than the fourth reference value, the vehicle speed is not less than the first reference value, the accumulation time when the vehicle speed is not less than the first reference value is not less than the third reference value, the RPM of the engine is not less than the second reference value, and the accumulation time when the RPM of the engine is not less than the second reference value is not less than the third reference value, the ECU stops the operation of the engine and performs the chip-heating function of the air flow sensor, thereby removing pollutants adhered to a chip built in the air flow sensor.

As described above, in the present invention, it is decided whether the condition for performing the chip-heating function of the air flow sensor is satisfied by detecting the operation history of the engine when the diesel hybrid electric vehicle enters into the hybrid operation mode, and the chip heating function of the air flow sensor is performed based on the decision result, so that it is possible to prevent deterioration of the quality of the air flow sensor due to the countercurrent of oil vapor generated when the operation of the engine is stopped in the diesel hybrid electric vehicle in which the driving of the engine is frequently stopped (e.g., the hybrid operation mode) as compared with a general diesel vehicle.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An air flow sensor chip-heating control device of a diesel hybrid electric vehicle, the device comprising:
   a hybrid control unit (HCU) configured to request an engine control unit (ECU) to stop operation of an engine when the diesel hybrid electric vehicle enters into a hybrid operation mode during operation of the engine, and transmit, to the ECU, vehicle status information when the diesel hybrid electric vehicle enters into the hybrid operation mode; and
   the ECU configured to decide an operation history of the engine based on the vehicle status information when the diesel hybrid electric vehicle enters into the hybrid operation mode, which is transmitted from the HCU, and determine whether a chip-heating operation of an air flow sensor is performed based on the decision result.

2. The device of claim 1, wherein the vehicle status information when the diesel hybrid electric vehicle enters into the hybrid operation mode includes information on an engine coolant temperature, information on a vehicle speed, information on an accumulation time when the vehicle speed is not less than a first reference value, information on revolutions per minute (RPM) of the engine, and information on an accumulation time when the RPM of the engine is not less than a second reference value.

3. The device of claim 1, wherein, in order to decide the operation history of the engine when the diesel hybrid electric vehicle enters into the hybrid operation mode, the ECU decides whether the engine is warmed up, whether the diesel hybrid electric vehicle is driven at high speed, and whether the engine is operated at high speed.

4. The device of claim 3, wherein, in order to decide whether the engine is warmed up when the diesel hybrid electric vehicle enters into the hybrid operation mode, the ECU decides whether the engine coolant temperature is not less than a fourth reference value, based on the vehicle status information transmitted from the HCU.

5. The device of claim 3, wherein, in order to decide whether the diesel hybrid electric vehicle is driven at high speed when the diesel hybrid electric vehicle enters into the hybrid operation mode, the ECU decides whether the vehicle speed is not less than a first reference value and whether the accumulation time when the vehicle speed is not less than the first reference value is not less than a third reference value, based on the vehicle status information transmitted from the HCU.

6. The device of claim 3, wherein, in order to decide whether the engine is operated at high speed when the diesel hybrid electric vehicle enters into the hybrid operation mode, the ECU decides whether the RPM of the engine is not less than a second reference value and whether the accumulation time when the RPM of the engine is not less than the second reference value is not less than a third reference value, based on the vehicle status information transmitted from the HCU.

7. The device of claim 2, wherein, if the engine coolant temperature is not less than a fourth reference value, the vehicle speed is not less than the first reference value, the accumulation time when the vehicle speed is not less than the first reference value is no less than the third reference value, the RPM of the engine is not less than the second reference value, and the accumulation time when the RPM of the engine is not less than the second reference value is not less than the third reference value, as the result obtained by deciding the operation history of the engine based on the vehicle status information when the diesel hybrid electric vehicle enters into the hybrid operation mode, the ECU stops the operation of the engine and performs the chip-heating operation of the air flow sensor in the diesel hybrid electric vehicle.

8. A method of operating an air flow sensor chip-heating control device of a diesel hybrid electric vehicle, comprising the steps of:

requesting, by a hybrid control unit (HCU), an engine control unit (ECU) to stop operation of an engine when the diesel hybrid electric vehicle enters into a hybrid operation mode during operation of the engine;

transmitting, to the ECU, vehicle status information when the diesel hybrid electric vehicle enters into the hybrid operation mode;

deciding an operation history of the engine, which is performed by the ECU based on the vehicle status information when the diesel hybrid electric vehicle enters into the hybrid operation mode, which is transmitted from the HCU; and determining whether a chip-heating operation of an air flow sensor is performed based on the step of deciding the operation history of the engine.

* * * * *